United States Patent [19]

Thill et al.

[11] Patent Number: 5,008,347

[45] Date of Patent: Apr. 16, 1991

[54] POLYALKYLOXAZOLINE-POLYCARBONATE-POLYALKYLOXAZOLINE TRIBLOCK COPOLYMER COMPATIBILIZER FOR POLYCARBONATE/POLYAMIDE BLENDS

[75] Inventors: Bruce P. Thill; Bruce A. King, both of Midland, Mich.

[73] Assignee: The Dow Chemical Company, Midland, Mich.

[21] Appl. No.: 540,971

[22] Filed: Jun. 18, 1990

Related U.S. Application Data

[62] Division of Ser. No. 264,920, Oct. 31, 1988, Pat. No. 4,954,579.

[51] Int. Cl.$^5$ .................... C08L 69/00; C08L 77/00; C08G 64/18
[52] U.S. Cl. .................................... 525/433; 525/467; 528/203
[58] Field of Search ................. 525/433, 467; 528/203

[56] References Cited

U.S. PATENT DOCUMENTS

| | | | |
|---|---|---|---|
| 3,574,784 | 4/1971 | Litt | 525/421 |
| 3,658,752 | 4/1972 | Dua | 525/232 |
| 4,111,895 | 9/1978 | Gergen et al. | 525/92 |
| 4,317,891 | 3/1982 | Sakano et al. | 525/66 |
| 4,540,747 | 9/1985 | Saegusa | 525/410 |
| 4,703,085 | 10/1987 | Dean | 525/91 |

OTHER PUBLICATIONS

"Preparation & Characterization of p-Toluene Sulfonyl Ester and Amino Derivative of Tri- and Poly(ethylene Glycol)", A. X. Swamikannu and M. H. Litt, Journal of Polymer Science: Polymer Chemistry Edition, 22, pp. 1623–1632 (1984).

"Reagents for Organic Synthesis", L. Fieser and M. Fieser, pp. 1158–1159, (1967).

"Synthesis of ABA Triblock Copolymers Containing Electrono-Donor or Electrono-Acceptor Pendant Groups in A Blocks", V. Percec, Polymer Bulletin, 5, pp. 643–649 (1981).

"Oligomers Derived from 2-Oxazolines", T. Saegusa and S. Kobayashi, J. Macromol. Sci.-Chem., A21, pp. 1021–1034 (1984).

"Block Copolymers of Poly(Ethylene Glycol)and Poly(N-Isovaleryl Ethyleneimine): Kinetics of Initiation", M. H. Litt and X. Swamikannu, Polymer Preprints, 25(1), pp. 242–244 (1984).

"Synthesis and Polymerization of 2-($\beta$-N-Ethylenediphenylamine)-2-Oxazoline", C. I. Simionescu, I. Rabia and I. Harfas, Polymer Bulletin, 7, pp. 129–135, (1982).

*Primary Examiner*—John C. Bleutge
*Assistant Examiner*—David Buttner

[57] ABSTRACT

Polyalkyloxazoline-polycarbonate-polyalkyloxazoline triblock copolymers are prepared by a novel process, and are useful as compatibilizing agents in polycarbonate/polyamide resin blends.

20 Claims, No Drawings

POLYALKYLOXAZOLINE-POLYCARBONATE-POLYALKYLOXAZOLINE TRIBLOCK COPOLYMER COMPATIBILIZER FOR POLYCARBONATE/POLYAMIDE BLENDS

CROSS REFERENCE TO RELATED APPLICATION

This is a divisional of application Ser. No. 264,920, filed Oct. 31, 1988 now U.S. Pat. No. 4,954,579.

FIELD OF THE INVENTION

This invention relates to a novel composition of matter comprising a polyalkyloxazoline-polycarbonate-polyalkyloxazoline triblock copolymer and its use as a compatibilizing agent in a blend of polycarbonate and polyamide resins.

BACKGROUND OF THE INVENTION

Polyamides are condensation products containing recurring amide groups, generally prepared by the condensation of a diamine and a dibasic acid or their equivalents, or the polymerization of bifunctional monomers. Polyamides are frequently referred to as nylons, and include, for example nylon 4, nylon 6, nylon 6,6, nylon 6,9, nylon 6,12, nylon 7, nylon 8, nylon 9, nylon 11, nylon 12, etc. Polyamides generally exhibit good solvent resistance, hydrolytic stability, abrasion resistance and mechanical strength due to their highly crystalline structure. They, however, do exhibit poor dimensional stability in humid environments due to water absorption, as well as poor creep performance at typical use temperatures.

Polycarbonate are well-known commercially available resinous materials having a variety of applications. They are typically prepared by the reaction of dihydroxy compounds and a carbonate precursor, such as phosgene. Polycarbonates are high temperature, high performance thermoplastic engineering polymers with a good combination of thermal and mechanical properties, especially when the polymer is prepared from one or more aromatic diols. However, polycarbonates do exhibit poor solvent resistance, particularly when exposed to humid environments for prolonged times and/or at elevated temperatures.

Polycarbonate/polyamide blends might be expected to have a useful balance of properties. Such blends could possess improved creep resistance and higher temperature resistance due to the polycarbonate component, and improved solvent resistance as a result of the polyamide component. Unfortunately, attempts to modify the properties of polycarbonate resins by blending with polyamides are quite often unsatisfactory because of their incompatibility. Simple blends of polycarbonate and polyamide resins are deficient in mechanical properties such as elongation and impact strength, thereby suggesting low interfacial adhesion.

Most combinations of polymers are not compatible, although a number of notable exceptions are known. Generally, polymers adhere poorly to one another resulting in interfaces between the component domains which provide natural sites for mechanical failures due to flaws and crack propagation. Because of this, the polymers are said to be "incompatible". Occasionally, such polymer blends may be compatibilized by adding a third component, referred to as a compatibilizing agent, which possesses a dual solubility characteristic for the two polymers. The compatibilizing agent generally locates at the interface between the polymers and greatly improves interfacial adhesion, and thereby increases the stability to gross phase separation.

U.S Pat. No. 4,111,895 discloses the use of a block copolymer, such as styrene-butadiene-styrene, as a compatibilizing agent between polycarbonate and a host of dissimilar thermoplastics, including polyamide. U.S. Pat. No. 4,317,891 discloses a blend of polycarbonate, polyamide, and a conjugated diene rubber copolymer. The copolymer does not, however, act as a compatibilizing agent, and the amount of polyamide is limited to 20 weight percent due to incompatibility with the polycarbonate at higher concentrations. Finally, U.S. Pat. No. 3,658,752 discloses a blend of an elastomer and a polyamide, and additionally contains as a third component a filler which acts as a compatibilizing agent.

SUMMARY OF THE INVENTION

The present invention is directed toward a novel composition of matter comprising a polyalkyl-oxazoline-polycarbonate-polyalkyloxazoline triblock copolymer, and its surprising use as a compatibilizing agent for a blend of polycarbonate and polyamide resins.

The novel triblock copolymers of the present invention correspond to the formula:

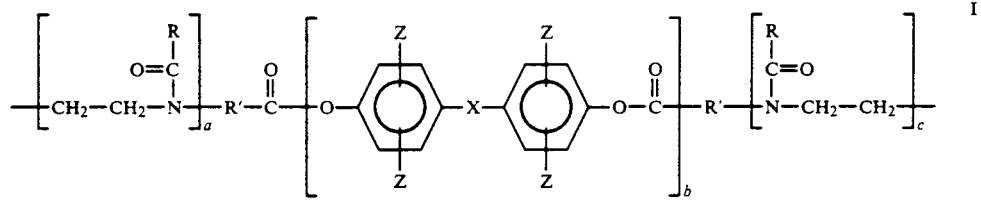

wherein X is a divalent $C_1-C_{15}$ hydrocarbon radical, a single bond, —O—, —S—, —S$_2$—, —SO—, —SO$_2$—, or —CO—, R is a monovalent $C_1-C_4$ alkyl radical, R' is a divalent $C_7-C_{19}$ alkyl radical, each Z is independently hydrogen, a halo radical, or a $C_1-C_4$ alkyl radical, b is a number greater than 0 equal to the number of repeated carbonate units in the polycarbonate block segment of the triblock copolymer, and a and c are each independently numbers greater than 0 equal to the numbers of repeated alkyloxazoline units in the polyalkyloxazoline block segments of the triblock copolymer.

The triblock copolymer may surprisingly be prepared by sequentially:

A) contacting together an α,Ω-hydroxyalkanoic acid having from 8 to 20 carbon atoms and an alkylsulfonyl halide or arenesulfonyl halide having from 7 to 14 carbon atoms, to prepare an Ω-sulfonylalkanoic acid;

B) next, contacting the Ω-sulfonylalkanoic acid from step A with a chlorinating agent, to prepare an Ω-sulfonylalkanoyl chloride;

C) thereafter, contacting the Ω-sulfonylalkanoyl chloride from step B with an aromatic dihydroxy compound and phosgene, under polycarbonate forming conditions, to prepare a polycarbonate having sulfonate end groups: and D) finally, contacting the polycarbonate from step C with a 2-alkyl-2-oxazoline, to prepare a polyalkyloxazoline-polycarbonate-polyalkyloxazoline triblock copolymer.

Surprisingly, it has also been discovered that a polyalkyloxazoline-polycarbonate-polyalkyloxazoline triblock copolymer is an effective compatibilizing agent in blends of polycarbonate and polyamide resins. The compatibilized, three-component blends of the present invention exhibit higher impact resistance, elongation, and solvent resistance than two-component polycarbonate/polyamide blends or such blends containing the third component compatibilizers heretofore known in the art.

The compatibilized blends of the present invention have utility where the combination of high modulus, temperature and solvent resistance, dimensional stability, creep resistance, hydrolytic stability, high elongation and impact strength are required, such as automotive body panels, appliance housings and electrically insulating molded components.

DETAILED DESCRIPTION

The aromatic polycarbonates suitable for use in the present invention are produced by any of the conventional processes known in the art for the manufacture of polycarbonates. Generally, aromatic polycarbonates are prepared by reacting an aromatic dihydric phenol with a carbonate precursor such as for example phosgene, a haloformate or a carbonate ester.

A preferred method for preparing the aromatic polycarbonates suitable for use in the present invention involves the use of carbonyl halide, such as phosgene, as the carbonate precursor. This method involves passing phosgene gas into a reaction mixture containing an activated dihydrio phenol, or a non-activated dihydric phenol and an acid acceptor, such as for example pyridine, dimethyl aniline, quinoline and the like. The acid acceptor may be used undiluted or diluted with inert organic solvents, such as methylene chloride, chlorobenzene or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature to 50° C. Since the reaction is exothermic, the rate of phosgene addition may be used to control the temperature of the reaction. The amount of phosgene required will generally depend upon the amount of dihydric phenols present. Generally speaking, one mole of phosgene will react with one mole of dihydric phenol to form the polycarbonate and two moles of HCl. The HCl is in turn taken up by the acid acceptor.

Another method for preparing the aromatic polycarbonates useful in the present invention comprises adding phosgene to an alkaline aqueous suspension of dihydric phenols. This is preferably done in the presence of inert solvents such as methylene chloride, 1,2-dichloroethane and the like. Quaternary ammonium compounds may be employed to catalyze the reaction.

Yet another method for preparing such aromatic polycarbonates involves the phosgenation of an agitated suspension of the anhydrous alkali salts of aryl diols in a nonaqueous medium such as benzene, chlorobenzene or toluene. The reaction is illustrated by the addition of phosgene to a slurry of the sodium salt of, for example, Bisphenol A in an inert polymer solvent such as chlorobenzene. The organic solvent should preferably be a polymer solvent.

Generally speaking, a haloformate such as the bishaloformate of Bisphenol A may be utilized in the same manner as the carbonate precursor in any of the methods described above.

When a carbonate ester is used as the carbonate precursor in the polycarbonate forming reaction, the materials are reacted at temperatures in excess of 100° C., for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon.

Although the polymer forming reaction may be conducted in the absence of a catalyst, one may, if desired, employ a typical ester exchange catalyst, such as metallic lithium, potassium, calcium or magnesium. The amount of such catalyst, if used, is usually small, ranging form about 0.001% to about 0.1%, based on the moles of the dihydric phenols employed.

In the solution methods of preparation, the aromatic polycarbonate emerges from the reaction in either a true or pseudo solution depending on whether an aqueous base or pyridine is used as an acid acceptor. The copolymer may be precipitated from the solution by adding a polymer nonsolvent, such as heptane or isopropanol. Alternatively, the polymer solution may be heated, typically under reduced pressure, to evaporate the solvent.

A preferred aromatic polycarbonate is characterized by repeated units corresponding to the general formula:

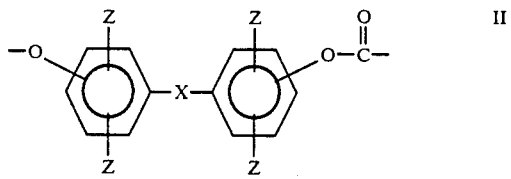

wherein X is a divalent $C_1$-$C_{15}$ hydrocarbon radical, a single bond, $-O-$, $-S-$, $-S_2-$, $-SO-$, $-SO_2-$, or $-CO-$, and each Z is independently hydrogen, a halo radical, or a $C_1$-$C_4$ alkyl radical. Examples of aromatic dihydroxy compounds from which the preferred polycarbonates may be prepared include, but are not limited to, 2,2-bis-(4-hydroxyphenyl)-propane, bis-(4-hydroxyphenyl)-methane, 1,1-bis-(4-hydroxyphenyl)-butane, 1,1-bis-(4-hydroxyphenyl)-cyclohexane, bis-(4-hydroxyphenyl)ketone, bis-(4-hydroxyphenyl)-sulfone, bis-(4-hydroxyphenyl)-ether, 2,2-bis-(3,5-dichloro-4-hydroxyphenyl)-propane, 2,2-bis-(3,5-dimethyl-4-hydroxyphenyl)-propane, and the like. A most preferred aromatic polycarbonate is prepared from 2,2-bis-(4-hydroxyphenyl)-propane (Bisphenol A).

The aforementioned methods of preparing aromatic polycarbonates are more fully set forth in U.S. Pat. Nos. 2,999,846, 3,028,365, 3,148,172, 3,153,008, 3,248,414, 3,271,367, and 4,452,968, which are hereby incorporated by reference thereto.

The polyamides suitable for use in the present invention are prepared by polymerizing a monoaminomonocarboxylic acid, or an internal lactam thereof, having at least two carbon atoms between the amino and carboxylic acid groups. Alternatively, they may be prepared by polymerizing substantially equimolar proportions of a diamine, which contains at least two carbon atoms between the amino groups, and a dicarboxylic acid. Yet another method for preparing the polyamides of the present invention is by polymerizing a monoaminomonocarboxylic acid, or an internal lactam thereof, together with substantially equimolar proportions of a diamine and a dicarboxylic acid. The dicarboxylic acid may be used in the form of a functional derivative thereof, such as for example, an ester.

Examples of monoaminomonocarboxylic acids or lactams thereof for preparing polyamides include, but are not limited to, those compounds containing from 2 to 16 carbon atoms between the amino and carboxylic acid groups, said carbon atoms forming a ring with the —CONH— group in the case of a lactam. As particular examples of monoaminomonocarboxylic acids and lactams there may be mentioned ε-aminocaproic acid, butyrolactam, pivalolactam, caprolactam, capryl-lactam, enanthclactam, undecanolactam, dodecanolactam, and 3- and 4-amino benzoic acids. A preferred monoaminomonocarboxylic acid is caprolactam.

Examples of preferred diamines for preparing polyamides to be used according to the present invention correspond to the general formula:

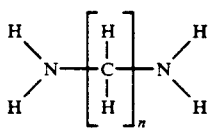

wherein n is an integer from 2 to 16. Specific examples include, but are not limited to, trimethylenediamine, tetramethylenediamine, pentamethylenediamine, hexamethylenediamine, octamethylenediamine, decamethylenediamine, dodecamethylenediamine and hexadecamethylenediamine. Other suitable diamines include, but are not limited to, 2,2-dimethylpentamethylenediamine, 2,2,4- and 2,4,4-trimethylhexamethylenediamine, p-phenylenediamine, 4,4'-diaminodiphenyl sulfone, 4,4'-diaminodiphenyl ether, 4,4'diaminodiphenylmethane and diaminodicyclohexylmethane. A most preferred diamine is hexamethylenediamine.

The dicarboxylic acids suitable for preparing polyamides for use according to the present invention may be aromatic, such as for example, isophthalic acid or terephthalic acid. Preferred dicarboxylic acids correspond to the general formula:

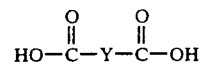

wherein Y is a divalent aliphatic radical containing at least 2 carbon atoms. Examples of such acids include, but are not limited to, sebacic acid, octadecanedioic acid, suberic acid, adipio acid, azelaic acid, undecanedioic acid, glutaric acid, pimelic acid and oxalic acid. A most preferred dicarboxylic acid is adipic acid.

Specific examples of polyamides for use according to the present invention are polypyrrolidone (nylon 4), polycaprolactam (nylon 6), polyhexamethylene adipamide (nylon 6,6), polyhexamethylene azelaiamide (nylon 6,9), polyhexamethylene dodecanedioamide (nylon 6,12), polyheptolactam (nylon 7), polycapryllactam (nylon 8), polynonanolactam (nylon 9), polyundecanolactam (nylon 11), polydodecanolactam (nylon 12), and the like. Most preferred are polycaprolactam and polyhexamethylene adipamide.

The polyalkyloxazoline-polycarbonate-polyalkloxazoline triblock copolymers suitable as compatibilizing agents of the present invention correspond to the general formula:

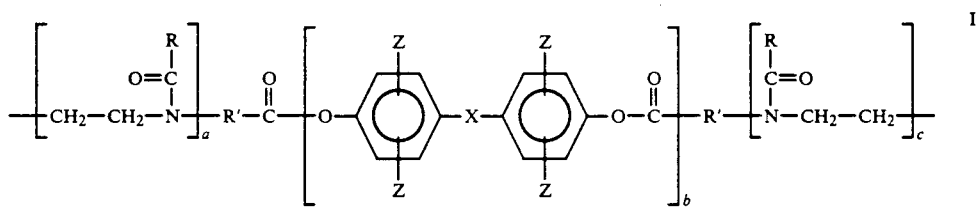

wherein X is as previously defined, R is a monovalent $C_1$-$C_4$ alkyl radical, each Z is independently hydrogen, a halo radical, or a $C_1$-$C_4$ alkyl radical, R' is a divalent $C_7$-$C_{19}$ alkyl radical, b is a number greater than 0 which represents the number of repeated carbonate units in the polycarbonate block segment of the triblock copolymer, and a and c each independently are numbers greater than 0 which represent the number of repeated alkyloxazoline units in the polyalkyloxazoline block segments of the triblock copolymer.

The triblock copolymers of the present invention effectively act as mechanical or structural stabilizers which interlock the polycarbonate and polyamide networks in a manner not fully understood at this time, resulting in a dimensionally stable polyblend that will not delaminate upon extrusion and subsequent use. The triblock copolymers are molecules having a polycarbonate compatible molecular segment and two molecular segments believed to be polyamide compatible, which segments are chemically linked to one another. A statistically small amount of a diblock copolymer, having a polyalkyloxazoline block and a polycarbonate block, is also formed during the process of the present invention. Such a diblock copolymer is thought to also act as a compatibilizer in a blend of polycarbonate and polyamide resins. Presently, however, there exists no practical synthetic route to prepare the diblock copolymer in commercial quantities.

The triblock copolymers are effective as compatibilizing agents when the polyalkyloxazolin block segments are each from about 10 to about 10,000 units in length: i.e., when a and c of Formula I are each independently 10 to 10,000. Preferably, the polyalkyloxazoline block segment lengths are from about 25 to about 10,000 units; i.e., a and c of Formula I are each independently 25 to 10,000. The polycarbonate block segment may be any length from about 10 to about 100,000, preferably about 100 to about 500: i.e., b of Formula I is about 100 to about 500. A triblock copolymer is an effective compatibilizer when the polyalkyloxazoline segments together comprise about 20% to about 80% by weight of the triblock copolymer; preferably about 35% to about 65% by weight.

Preparation of the triblock copolymers of the present invention may be carried out in a series of essential steps in which, in the first step, an α,Ω-hydroxyalkanoic acid having from 8 to 20 carbon atoms is contacted with an alkylsulfonyl halide or arenesulfonyl halide having from 7 to 14 carbon atoms to prepare an Ω-sulfonylalkanoic acid. The reaction is carried out in the presence of pyridine, in a stirred reaction vessel maintained at a temperature in the range from about −40° C. to about 50° C., preferably from about −20° C. to about −30° C., by the dropwise addition of the halide into the acid/pyridine mixture. Examples of α,Ω-hydroxyalkanoic acids for use according to the present invention are 12-hydroxydodecanoio acid, 10-hydroxydecanoic acid and 16-hydroxyhexadecanoic acid, each of which is commercially available from the Aldrich Chemical Company, and described in Beilstein, "Handbuch Der Organishen Chemie", v. 3, pp. 242-362. A preferred α,Ω-hydroxyalkanoio acid is 12-hydroxydecanoic acid. Examples of alkylsulfonyl halides and arenesulfonyl halides are p-toluenesulfonyl chloride, p-nitrobenzenesulfonyl chloride, benzenesulfonyl chloride and methanesulfonyl chloride, each of which is commercially available from the Aldrich Chemical Company, and described in Beilstein, "Handbuch Der Organishen Chemie", v. 4, p 5 and v. 11, pp. 34-103. A preferred arenesulfonyl halide is p-toluenesulfonyl chloride. The following reaction example utilizes 12-hydroxydodecanoic acid and p-toluenesulfonyl chloride for illustrative purposes:

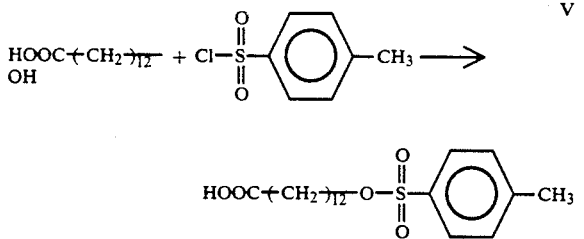

The Ω-sulfonylalkanoic acid is then isolated by conventional means for use in the next step.

Secondly, a chlorinating agent is contacted with the Ω-sulfonylalkanoic acid to prepare an agents for use according to the present invention are thionyl chloride, phosphorous trichloride, phosphorous pentachloride, phosphorous oxychloride and carboxylic acid chlorides such as benzoyl chloride. These chlorinating agents are well known in the art, and their manufacture is described in Wagner and Zook, "Synthetic Organic Chemistry", John Wiley & Sons, New York (1953) pp. 546-557. A preferred chlorinating agent is thionyl chloride. The following reaction example utilizes thionyl chloride and 12-(p-toluene -sulfonyloxy)-dodecanoic acid to prepare 12-(p-toluene -sulfonyloxy)-dodecanoyl chloride, for illustrative purposes:

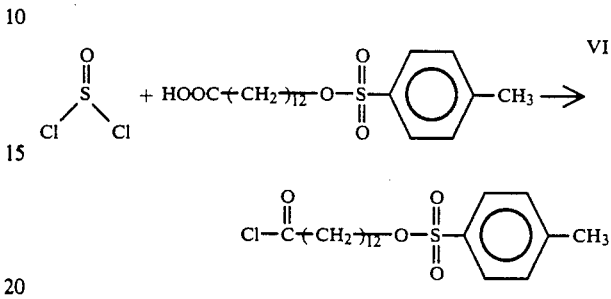

The reaction is carried out in a stirred reaction vessel at a temperature from about 0° C. to about 50° C., preferably from about 15° C. to about 30° C. The Ω-sulfonylalkanoyl chloride is isolated by conventional means for further processing.

Thirdly, the Ω-sulfonylalkanoyl chloride is contacted with a large excess of an aromatic dihydroxy compound of the general formula:

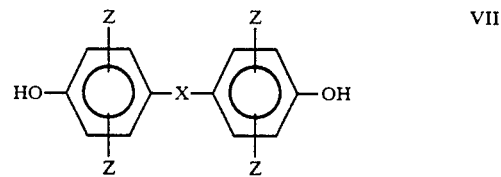

wherein X and Z are as previously defined. The contacting is carried out under polycarbonate forming conditions: e.g., by solution polymerization wherein an aromatic dihydroxy compound is contacted with phosgene in the presence of pyridine, or by interfacial polymerization wherein an aromatic dihydroxy compound is contacted with phosgene, in an emulsion of water and methylene chloride, in the presence of an amine catalyst. Phosgene is introduced into the stirred mixture, and the temperature is maintained from about 0° C. to about 40° C., preferably from about 10° C. to about 25° C.

As an example of the third process step of the present invention, a polycarbonate having tosylate end groups may be prepared by the reaction between 12-(p-toluenesulfonyloxy)-dodecanoyl chloride and an aromatic hydroxy compound. The polycarbonate having tosylate end groups is represented by the following formula:

wherein X and Z are as previously defined, and m is a whole number greater than 0 which represents the degree of polycarbonate polymerization. The polycarbonate having sulfonate end groups (in the previous example,

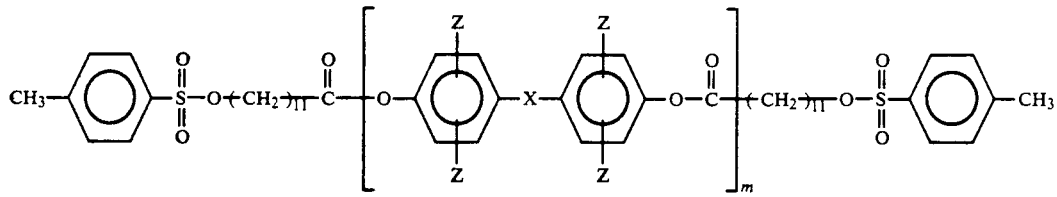

having tosylate end groups) is then isolated by conventional means.

Finally, the polycarbonate having sulfonate end groups is contacted with a 2-alkyl-2-oxazoline having the following structure:

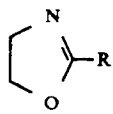

IX wherein R is a monovalent $C_1$–$C_4$ alkyl radical, to prepare the polyalkyloxazoline-polycarbonate-polyalkyloxazoline triblock copolymer of the present invention. 2-Alkyl-2-oxazolines include for example 2-methyl-2-oxazoline, 2-ethyl-2-oxazoline and 2-n-propyl-2-oxazoline, each of which is commercially available from the Aldrich Chemical Company, and which are described in Frump, "Chemical Reviews", (1971) p. 483. A preferred 2-alkyl-2-oxazoline is 2-ethyl-2-oxazoline. The reaction is carried out in a stirred vessel, in the presence of a suitable organic solvent. By the term suitable organic solvent is meant a solvent which dissolves the reactants and the products, which does not react with either the reactants or products, and which can easily be heated to the desired reaction temperature. Examples of suitable organic solvents include aromatic hydrocarbons, halogenated aromatic hydrocarbons, esters, ketones and nitriles. A preferred organic solvent is chlorobenzene. The mixture is maintained at a temperature from about 100° C. to about 150° C., preferably from about 120° C. to about 140° C. The 2-alkyl-2-oxazoline replaces the sulfonate end groups of the polycarbonate, and further polymerizes to form the triblock copolymer of Formula I. The triblock copolymer is isolated and recovered by conventional means, and may be subsequently employed as a compatibilizing agent in a blend of polycarbonate and polyamide resins.

It must be understood that other steps may be performed before, during or after the recited sequence of essential steps, as long as they do not change the basic nature of the process. Additionally, the various reaction conditions are not sharply critical, and each reaction step may be conducted over a wide range of temperatures, pressures and reaction times.

The chemical reactions described hereinabove are generally disclosed in terms of their broadest application to the practice of the present invention. Occasionally, the reactions as described may not be strictly applicable to each compound included within the disclosed scope of the invention. Those compounds for which this occurs will be readily recognized by those ordinarily skilled in the art. In all such cases, either the reactions may be successfully performed by conventional modifications known to those ordinarily skilled in the art, e.g., by changing to alternative conventional reagents, by routine modification of reaction conditions, etc., or other reactions which are conventional, will be applicable to the practice of the present invention.

The compatibilized blends of the present invention may be prepared by mixing the polycarbonate and polyamide resins and triblock copolymer in any order, by any conventional mixing apparatus. A suitable method comprises first mixing together a polycarbonate and a polyamide in a ratio from about 80:20 to about 20:80: preferably the ratio is from about 65:35 to about 35:65. Thereafter, a compatibilizing amount of the triblock copolymer is added. By compatibilizing amount is meant that amount of triblock copolymer which is effective to inhibit delamination of the polycarbonate and polyamide phases during extrusion and subsequent use. The compatibilizing amount of triblock eopolymer added to the polycarbonate and polyamide resins is desirably in the range of from about 0.1% to about 20%, based upon the total weight of polymers; preferably the range is from about 2% to about 5%, based upon the total weight of the polymers.

The compatibilized polymer blends of polycarbonate, polyamide and triblock copolymer may additionally contain, in either or both major phases, elastomeric impact modifiers such as, for example, acrylonitrile-butadiene-styrene copolymers (ABS rubbers), methylmethacrylate-butadiene-styrene copolymers (MBS rubbers), hydrogenated styrene-butadiene copolymers, functionalized EPDM copolymers, acrylic latexes, polybutadiene, polyisoprene, polybutene, and the like.

The compatibilized blends of the present invention may furthermore contain the conventional polymer additives such as, for example, fillers, reinforcing agents, stabilizers, dyes, flame retarding agents, mold-release agents, seed-forming agents, pigments, plasticizers, antistatic agents, ultraviolet light absorbers, lubricants, and the like.

The invention is more easily comprehended by reference to specific embodiments which are representative of the invention. It must be understood, however, that the specific embodiments are provided only for the purpose of illustration, and that the invention may be practiced otherwise than as specifically illustrated and described without departing from its scope.

EXAMPLE 1

Preparation of Polyethyloxazoline-Polycarbonate-Polyethyloxazoline Triblock Copolymer 12-hydroxydodecanoic acid (15.0 g) and pyridine (20 ml) were placed in a reaction vessel at 0° C., having a nitrogen atmosphere. The temperature was maintained below 10° C. during the dropwise addition of a solution of p-toluenesulfonyl chloride (13.2 g) in 25 ml of pyridine. After stirring for one hour, the reaction mixture was diluted with 400 ml of methylene chloride. The resultant mixture was then extracted, first using a solution of 50 ml of hydrochloric acid in 250 ml of water, then twice using 100 ml of 1.0N hydrochloric acid. The resultant mixture was dried over anhydrous magnesium sulfate, filtered, and the methylene chloride evaporated at reduced pressure. The resultant solid was recrystallized from cyclohexane, and exhibited a melting point of 45° C. to 48° C., and an NMR spectrum consistent with the structure of 12-(p-toluene-sulfonyloxy)-dodecanoic acid.

A second reaction vessel, containing 14.5 g of thionyl chloride, was prepared. The 12-(p-toluene-sulfonyloxy)-dodecanoic acid was added all at once, with stirring. The reaction mixture was refluxed for 30 minutes, until the evolution of hydrochloric acid ceased. Excess thionyl chloride was removed using a rotary evacuator. The resultant product exhibited an NMR spectrum consistent with the structure of 12-(p-toluene-sulfonyloxy)-dodecanoyl chloride.

Next, a 2 liter reaction vessel was prepared, having a nitrogen inlet, a phosgene inlet dip-tube, and a stirrer. Bisphenol A (91.3 g), pyridine (85 ml), 12-(p-toluenesulfonyloxy)-dodecanoyl chloride (8.0 g), and methylene chloride were added and a nitrogen atmosphere placed over the stirred mixture. Phosgene was introduced into the reaction mixture at a rate of approximately 1 g/min. while the temperature of the reaction mixture was maintained below 25° C. using an ice bath. As the theoretically required amount of phosgene (sufficient to polymerize the Bisphenol A) was approached, the rate of phosgene addition was reduced, and the reaction mixture was periodically analyzed for the presence of free phosgene. After excess phosgene was detected, phosgene addition was stopped and the resultant reaction mixture was washed, first with a solution of 36 ml of hydrochloric acid in 110 ml of water, then with a solution of 10 ml of hydrochloric acid in 200 ml of water. The resultant polycarbonate having tosylate end groups was precipitated in 2 liters of n-hexane, then filtered off and dried 4 hours al 100° C. in a vacuum oven. The polymer exhibited an inherent viscosity of 0.32 dL/g (0.125 g of polymer in 5 ml methylene chloride at 25° C.). The presence of tosylate end groups was confirmed by NMR analysis.

Finally, 50.0 g of the polycarbonate having tosylate end groups was placed in a reaction vessel containing 330 ml of chlorobenzene. The mixture was heated to reflux at about 132° C., while being stirred under a nitrogen atmosphere, to dissolve the polymer. 2-Ethyl-2-oxazoline (50.0 g) was added over a period of about one minute. The mixture was stirred and refluxed for a period of three hours, during which time a polyethyloxazoline-polycarbonate-polyethyloxazoline triblock copolymer formed. The chlorobenzene was distilled from the mixture, and the resultant copolymer was ground and further extracted using hexane. The resultant copolymer was dried overnight at 90° C. in a vacuum oven. NMR analysis indicated that the copolymer contained 40% by weight of polyethyloxazoline and 60% by weight of polycarbonate. The inherent viscosity of the copolymer was 0.30 d L/g in methylene chloride at 25° C.

EXAMPLE 2

Preparation of Polyethyloxazoline-Polycarbonate-Polyethyloxazoline Triblock Copolymer The method of preparation described in Example 1 was duplicated, excepting that a mixture of 70% by weight of ethyloxazoline and 30% by weight of polycarbonate having tosylate end groups was copolymerized, resulting in a triblock copolymer having 60% by weight of polyethyloxazoline and 40% by weight of polycarbonate.

EXAMPLES 3-7

Preparation of Polymeric Blends of Polycarbonate, Polyamide and Polyethyloxazoline-Polycarbonate-Polyethyloxazoline Triblock Copolymer Compatibilizing Agent Dry blends of polycarbonate and polyamide resins, and the triblock copolymer of Example 1, were prepared in the proportions described in Table I. After tumbling the dry ingredients for five minutes, the individual blends were dried in a vacuum oven at 75° C. and 3 torr for 16 hours, and thereafter, quickly placed in air-tight containers until melt blended.

Subsequently, the blends were melt-mixed in a co-rotating twin screw extruder. The resulting blended polymer strands were quenched in a water bath and pelletized. These pellets were thoroughly dried, and injection molded into test specimens whose mechanical properties are described in Table 2.

TABLE 1

| | BLEND COMPOSITIONS | | | | |
|---|---|---|---|---|---|
| | Polycarbonate[1] | Polyamide[2] | Rubber[3] Modified Polycarbonate | Rubber[4] Modified Polyamide | Triblock[5] Copolymers |
| Example 3 | 57.5 | 40 | | | 2.5 |
| Example 4 | 57.5 | | | 40 | 2.5 |
| Example 5 | | | 57.5 | 40 | 2.5 |
| Example 6 | | | 55 | 40 | 5.0 |
| Example 7 | | | 58.75 | 40 | 1.25 |
| Comparison 1 | 60 | 40 | | | |
| Comparison 2 | 60 | | | 40 | |
| Comparison 3 | | | 60 | 40 | |

[1]CALIBRE 300-15 ® brand polycarbonate, The Dow Chemical Company.
[2]Nylon 6,6, ZYTEL 101 ® brand polyamide, DuPont.
[3]90% CALIBRE 300-15 ® brand polycarbonate, and 10% KRATON 1651 ® brand hydrogenated styrene/butadiene block copolymer, Shell Chemical.
[4]ZYTEL ST 801 ® brand rubber modified nylon 6,6, DuPont.
[5]Triblock copolymer prepared in Example 1.

TABLE 2

| | MECHANICAL PROPERTIES | | | | |
|---|---|---|---|---|---|
| | Tensile Yield (psi) | Modulus (psi × $10^5$) | Elongation (percent) | Notched Izod (ft-lb/in) | Dart Impact (in-lbs) |
| Example 3 | 11,300 | 4.6 | >50 | 0.5 | 10 |
| Example 4 | 8,300 | 3.5 | >50 | 1.1 | 230 |
| Example 5 | 7,500 | 3.3 | >50 | 2.8 | 460 |
| Example 6 | 7,700 | 3.3 | >50 | 7.4 | 350 |
| Example 7 | 7,600 | 3.3 | >50 | 3.7 | 280 |
| Comparison 1 | 10,800 | 5.2 | 4 | 0.4 | 10 |
| Comparison 2 | 7,800 | 3.2 | 29 | 2.0 | 11 |
| Comparison 3 | 7,000 | 3.0 | 16 | 2.0 | 35 |

What is claimed is:

1. A triblock copolymer of the formula:

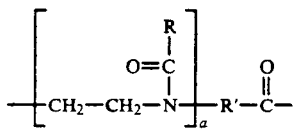

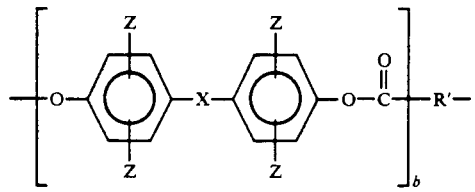

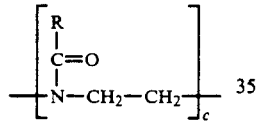

wherein X is a divalent $C_1$-$C_{15}$ hydrocarbon radical, a single bond, —O—, —S—, —$S_2$—, —SO—, —$SO_2$—, or —CO—, R is a monovalent $C_1$-$C_4$ alkyl radical, R' is a divalent $C_7$-$C_{19}$ alkyl radical, each Z is independently hydrogen, a halo radical, or a $C_1$-$C_4$ alkyl radical, b is a number greater than 0 equal to the number of repeated carbonate units in the polycarbonate block segment of the triblock copolymer, and a and c are each independently numbers greater than 0 equal to the numbers of repeated alkyloxazoline units in the polyalkyloxazoline block segments of the triblock copolymer.

2. The triblock copolymer of claim 1, wherein X is a $C_3$ hydrocarbon radical, R is a $C_2$ alkyl radical, and each Z is hydrogen.

3. The triblock copolymer of claim 1, wherein a is from about 10 to about 10,000, b is from about 100 to about 100,000, and c is from about 10 to about 10,000.

4. The triblock copolymer of claim 3, wherein a is from about 25 to about 10,000, b is from about 10 to about 500, and c is from about 25 to about 10,000.

5. The triblock copolymer of claim 1, wherein the polyalkyloxazoline block segments together comprise from about 20% to about 80% by weight of the triblock copolymer.

6. The triblock copolymer of claim 5, wherein the polyalkyloxazoline block segments together comprise from about 35% to about 65% by weight of the triblock copolymer.

7. A thermoplastic molding composition, comprising:
A) an aromatic polycarbonate;
B) a polyamide; and
C) a compatibilizing amount of a triblock copolymer corresponding to the formula:

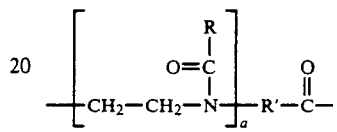

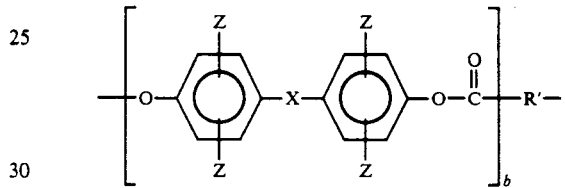

wherein X is a divalent $C_1$-$C_{15}$ hydrocarbon radical, a single bond, —O—, —S—, —$S_2$—, —SO—, —$SO_2$—, or —CO—, R is a monovalent $C_1$-$C_4$ alkyl radical, R' is a divalent $C_7$-$C_{19}$ alkyl radical, each Z is independently hydrogen, a halo radical, or a $C_1$-$C_4$ alkyl radical, b is a number greater than 0 equal to the number of repeated carbonate units in the polycarbonate block segment of the triblock copolymer, and a and c are each independently numbers greater than 0 equal to the numbers of repeated alkyloxazoline units in the polyalkyloxazoline block segments of the triblock copolymer.

8. The thermoplastic molding composition of claim 19, wherein the aromatic polycarbonate is characterized by repeated units corresponding to the general formula:

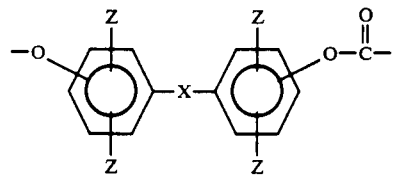

wherein X is a divalent $C_1$-$C_{15}$ hydrocarbon radical, a single bond, —O—, —S—, —$S_2$—, —SO—, —$SO_2$—, or —CO—, and each Z is independently hydrogen, a halo radical, or a $C_1$-$C_4$ alkyl radical.

9. The thermoplastic molding composition of claim 20, wherein the aromatic polycarbonate is Bisphenol A polycarbonate.

10. The thermoplastic molding composition of claim 7, wherein the polyamide is selected from the group consisting of polypyrrolidone, polycaprolactam, polyhexamethylene adipamide, polyhexamethylene azelaiamide, polyhexamethylene dodecanedioamide, polyheptolactam, polycapryllactam, polynonanolactam, polyundecanolactam and polydodecanolactam.

11. The thermoplastic molding composition of claim 22, wherein the polyamide is polycaprolactam or polyhexamethylene adipamide.

12. The thermoplastic molding composition of claim 19, wherein X is a $C_3$ hydrocarbon radical, R is a $C_2$ alkyl radical, and each Z is hydrogen.

13. The thermoplastic molding composition of claim 7, wherein a is from about 10 to about 10,000, b is from about 100 to about 100,000, and c is from about 10 to about 10,000.

14. The thermoplastic molding composition of claim 13, wherein a is from about 25 to about 10,000, b is from about 10 to about 500, and c is from about 25 to about 10,000.

15. The thermoplastic molding composition of claim 7, wherein the polyalkyloxazoline block segments together comprise from about 20% to about 80% by weight of the triblock copolymer.

16. The thermoplastic molding composition of claim 15, wherein the polyalkyloxazoline block segments together comprise from about 35% to about 65% by weight of the triblock copolymer.

17. The thermoplastic molding composition of claim 7, wherein the weight ratio of polycarbonate to polyamide is from about 80:20 to about 20:80.

18. The thermoplastic molding composition of claim 17, wherein the weight ratio of polycarbonate to polyamide is from about 65:35 to about 35:65.

19. The thermoplastic molding composition of claim 7, wherein the triblock copolymer comprises from about 0.1% to about 20% of the total weight of polymers.

20. The thermoplastic molding composition of claim 19, wherein the triblock copolymer comprises from about 2% to about 5% of the total weight of polymers.

* * * * *

UNITED STATES PATENT AND TRADEMARK OFFICE
CERTIFICATE OF CORRECTION

PATENT NO. : 5,008,347

DATED : April 16, 1991

INVENTOR(S) : Bruce P. Thill and Bruce A. King

It is certified that error appears in the above-identified patent and that said Letters Patent is hereby corrected as shown below:

Col. 14

Claim 8, line 50, "19" should correctly appear --7--.

Claim 9, line 67, "20" should correctly appear --8--.

Col. 15

Claim 11, line 9, "22" should correctly appear --10--.

Claim 12, line 12, "19" should correctly appear --7--.

Signed and Sealed this

First Day of December, 1992

Attest:

DOUGLAS B. COMER

Attesting Officer

Acting Commissioner of Patents and Trademarks